(12) United States Patent
Choi et al.

(10) Patent No.: US 10,852,559 B2
(45) Date of Patent: *Dec. 1, 2020

(54) LIGHT GUIDE PLATE, BACKLIGHT UNIT, AND HOLOGRAPHIC DISPLAY APPARATUS INCLUDING THE BACKLIGHT UNIT

(71) Applicant: SAMSUNG ELECTRONICS CO., LTD., Suwon-si (KR)

(72) Inventors: Chilsung Choi, Suwon-si (KR); Hoon Song, Yongin-si (KR); Jungkwuen An, Suwon-si (KR); Sunil Kim, Seoul (KR); Sunghoon Lee, Seoul (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 219 days.

This patent is subject to a terminal disclaimer.

(21) Appl. No.: 15/946,282

(22) Filed: Apr. 5, 2018

(65) Prior Publication Data

US 2019/0049739 A1 Feb. 14, 2019

(30) Foreign Application Priority Data

Aug. 14, 2017 (KR) ........................ 10-2017-0103206

(51) Int. Cl.
*G03H 1/22* (2006.01)
*G02B 30/26* (2020.01)
*F21V 8/00* (2006.01)

(52) U.S. Cl.
CPC ............ *G02B 30/26* (2020.01); *G02B 6/005* (2013.01); *G02B 6/0023* (2013.01); *G02B 6/0035* (2013.01); *G02B 6/0055* (2013.01); *G02B 6/0076* (2013.01); *G02B 6/0088* (2013.01); *G03H 1/2202* (2013.01); *G03H 1/2286* (2013.01); *G03H 1/2294* (2013.01); *G02B 6/0016* (2013.01); *G03H 2001/2223* (2013.01);

(Continued)

(58) Field of Classification Search
CPC ............. G03H 1/22; H04N 9/00; H04N 13/00
USPC ....................................... 359/1–35
See application file for complete search history.

(56) References Cited

U.S. PATENT DOCUMENTS

| 5,877,874 A | * | 3/1999 | Rosenberg ............... G02B 5/32 |
| | | | 359/15 |
| 7,505,061 B2 | | 3/2009 | Jones et al. |
| 7,845,826 B2 | | 12/2010 | Aylward et al. |

(Continued)

FOREIGN PATENT DOCUMENTS

| JP | 2002-296591 A | 10/2002 |
| JP | 2004-54273 A | 2/2004 |

(Continued)

OTHER PUBLICATIONS

Communication Jan. 7, 2019 issued by the European Patent Office in counterpart European Patent Application No. 18187770.5.

*Primary Examiner* — William R Alexander
*Assistant Examiner* — Tamara Y. Washington
(74) *Attorney, Agent, or Firm* — Sughrue Mion, PLLC

(57) ABSTRACT

Provided are a light guide plate, a backlight unit, and a holographic display apparatus including the backlight unit. The backlight unit includes a light source and a light guide plate including two or more layers configured to guide light from the light source, wherein the two or more layers are configured to control a ratio of light transmitted therethrough to light reflected thereby.

26 Claims, 12 Drawing Sheets

(52) U.S. Cl.
CPC ..... *G03H 2223/16* (2013.01); *G03H 2225/30* (2013.01)

(56) References Cited

U.S. PATENT DOCUMENTS

| | | | |
|---|---|---|---|
| 9,007,296 B2 | 4/2015 | Lee et al. | |
| 9,213,132 B2 | 12/2015 | Jung et al. | |
| 9,482,807 B2 | 11/2016 | Wheatley et al. | |
| 2004/0062502 A1 | 4/2004 | Levola | |
| 2009/0323144 A1 | 12/2009 | Gruhlke et al. | |
| 2010/0103488 A1* | 4/2010 | Gruhlke | G02B 6/0035 359/15 |
| 2010/0172002 A1* | 7/2010 | Yamakawa | G11B 7/0065 359/11 |
| 2011/0149201 A1* | 6/2011 | Powell | G02F 1/133615 349/62 |
| 2011/0227487 A1* | 9/2011 | Nichol | G02B 6/0018 315/158 |
| 2011/0255303 A1* | 10/2011 | Nichol | G02B 6/0018 362/606 |
| 2011/0255305 A1 | 10/2011 | Chen et al. | |
| 2011/0273906 A1* | 11/2011 | Nichol | G02B 6/0076 362/607 |
| 2011/0277361 A1* | 11/2011 | Nichol | G02B 6/0018 40/541 |
| 2012/0287117 A1 | 11/2012 | Weber et al. | |
| 2014/0049983 A1* | 2/2014 | Nichol | G02B 6/0018 362/610 |
| 2015/0253487 A1* | 9/2015 | Nichol | G02B 6/0036 362/610 |
| 2016/0065955 A1 | 3/2016 | Kim et al. | |
| 2016/0131822 A1 | 5/2016 | Tai et al. | |
| 2017/0010456 A1* | 1/2017 | Gopinath | G02B 21/0032 |
| 2017/0222106 A1* | 8/2017 | Nakabayashi | H01L 33/502 |
| 2018/0032030 A1 | 2/2018 | Kim et al. | |
| 2018/0173057 A1 | 6/2018 | Choi et al. | |
| 2019/0025930 A1* | 1/2019 | Fransson | G02B 1/14 |
| 2019/0069403 A1* | 2/2019 | Heikkinen | H05K 1/181 |
| 2019/0101763 A1* | 4/2019 | Ihmels | G02B 27/0172 |
| 2019/0146221 A1* | 5/2019 | Oku | H04N 5/64 |

FOREIGN PATENT DOCUMENTS

| | | |
|---|---|---|
| KR | 10-2011-0034651 A | 4/2011 |
| KR | 10-2014-0031305 A | 3/2014 |
| KR | 10-2015-0086696 A | 7/2015 |
| KR | 10-1680771 B1 | 11/2016 |
| KR | 10-1716922 B1 | 3/2017 |
| KR | 10-2018-0012058 A | 2/2018 |
| KR | 10-2018-0072356 A | 6/2018 |
| WO | 2009/127849 A1 | 10/2009 |

* cited by examiner

LIGHT GUIDE PLATE, BACKLIGHT UNIT, AND HOLOGRAPHIC DISPLAY APPARATUS INCLUDING THE BACKLIGHT UNIT

CROSS-REFERENCE TO RELATED APPLICATION

This application claims priority from Korean Patent Application No. 10-2017-0103206, filed on Aug. 14, 2017, in the Korean Intellectual Property Office, the disclosure of which is incorporated herein in its entirety by reference.

BACKGROUND

1. Field

Apparatuses consistent with exemplary embodiments relate to light guide plates configured to reduce a stripe of an image, backlight units, and holographic display apparatuses including the same.

2. Description of the Related Art

As a method of implementing a three-dimensional image, glass methods and glassless methods are known. Glass methods include a polarized glass method and a shutter glass method, and glassless methods include a lenticular method and a parallax barrier method. These methods are based on the binocular parallax of a viewer's eyes, and thus, these methods may not only preclude an increase in the number of viewpoints but also may cause the viewer to feel fatigue if the focus of the viewer's eyes does not match the depth recognized by the brain.

As a three-dimensional image display method in which the focus of the viewer's eyes matches the depth recognized by the brain and an which full parallax may be provided, a holographic display method is known. The holographic display method utilizes an image of an original object which is reproduced by irradiating and diffracting reference light on a hologram pattern and utilizing an interference pattern obtained by object light reflected from the original object interfering with the reference light. One known holographic display method provides a computer-generated hologram (CGH) as an electrical signal to a spatial light modulator in order to obtain a hologram pattern, rather than directly exposing the original object itself. The spatial light modulator may form a hologram pattern according to an input CGH signal to diffract reference light to generate a three-dimensional image.

However, a very-high-resolution spatial light modulator and a very large data throughput are required to implement this full holographic display method. Recently, a binocular hologram method, that only provides a holographic image to each of the view fields corresponding to the viewer's eyes, has been proposed to alleviate data throughput and resolution requirements. For example, such a binocular hologram method may only generate two holographic images: an image having a viewpoint corresponding to the left-eye view field of the viewer and a holographic image having a viewpoint corresponding to the right-eye view field of the viewer and may provide the generated holographic images respectively to the left eye and the right eye of the viewer. In this case, since it is not necessary to generate holographic images for the other viewpoints, the data throughput may be greatly reduced and the resolution requirement of the spatial light modulator may be satisfied, even by a currently commercialized display apparatus.

Meanwhile, in comparison with a backlight unit (BLU) used in a liquid crystal display (LCD), a BLU used in a holographic display uses highly coherent light. Such a BLU uses a grating to maintain the coherence of the light emitted from a light guide plate. However, the result is often that the light guided within the light guide plate is only incident on the surface of the light guide plate in certain regions, such that the light transmitted out from the surface of the light guide plate is concentrated in these regions, causing an uneven distribution of light appearing as a stripe in the resultant image, thus degrading image quality.

SUMMARY

One or more exemplary embodiments may provide light guide plates configured to reduce a stripe in an image.

One or more exemplary embodiments may provide backlight units including light guide plates configured to reduce a stripe in an image.

One or more exemplary embodiments may provide holographic display apparatuses including light guide plates configured to reduce a stripe in an image.

Additional exemplary aspects and advantages will be set forth in part in the description which follows and, in part, will be apparent from the description, or may be learned by practice of the presented exemplary embodiments.

According to an aspect of an exemplary embodiment, a backlight unit includes: a light source; and a light guide plate including two or more layers configured to guide light from the light source, wherein the two or more layers are configured to control a ratio between light reflected thereby and light transmitted therethrough.

The two or more layers may include a first layer, a second layer, and a third layer, and the second layer may have a different refractive index than at least one of the first layer and the third layer.

The first layer and the second layer may have a refractive index difference of about 0.2 or more therebetween.

The second layer and the third layer may have different refractive indices.

The second layer and the third layer may have a refractive index difference of about 0.2 or more therebetween.

The first layer, the second layer, and the third layer may each have a refractive index of about 1.2 to about 2.0.

The first layer and the third layer each may have a thickness of about 0.1 mm to about 5 mm.

The backlight unit may further include a reflective layer disposed on the first layer.

The second layer may include an adhesive layer.

The first layer, the second layer, and the third layer may be stacked repeatedly two or more times.

The backlight unit may further include, disposed on the third layer, an input grating and an output grating.

The first layer and the third layer may have different thicknesses.

The first layer may be thinner than the third layer.

One of the two or more layers may include a transmittance control layer.

The transmittance control layer may have a transmittance of about 40% to about 60%.

The two or more layers may include: a first layer; a second layer including an adhesive layer; a third layer configured to control a transmittance of light therethrough; and a fourth layer.

The first layer and the second layer may have a same refractive index.

The first layer and the fourth layer each may have a thickness of about 0.1 mm to about 5 mm.

The first layer, the second layer, the third layer, and the fourth layer may be stacked repeatedly two or more times.

The backlight unit may further include, disposed on the fourth layer, an input grating and an output grating.

The first layer and the fourth layer may have different thicknesses.

According to an aspect of another exemplary embodiment, a light guide plate includes: a first layer configured to guide light; a second layer; and a third layer configured to guide light, wherein the light guide plate is configured to control a ratio between light transmitted and light reflected.

The first layer and the second layer may have a refractive index difference of about 0.2 or more therebetween.

The second layer may include a coating layer configured to control a transmittance of light therethrough.

The second layer may have a transmittance of about 40% to about 60%.

According to an aspect of another exemplary embodiment, a holographic display apparatus includes: a light source; a light guide plate including two or more layers configured to guide light from the light source to be propagated, wherein the two or more layers are configured to control a ratio between light reflected therefrom and light transmitted therethrough; and a spatial light modulator configured to reproduce a holographic image by diffracting incident light from the light guide plate.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Figure 1:
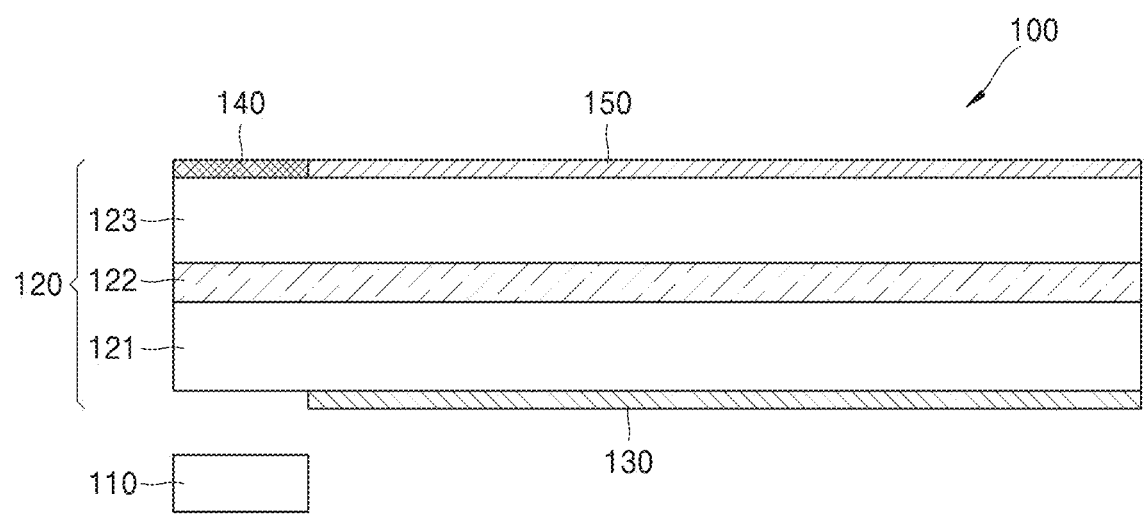
FIG. 1 schematically illustrates a backlight unit according to an exemplary embodiment.
Figure 2A:
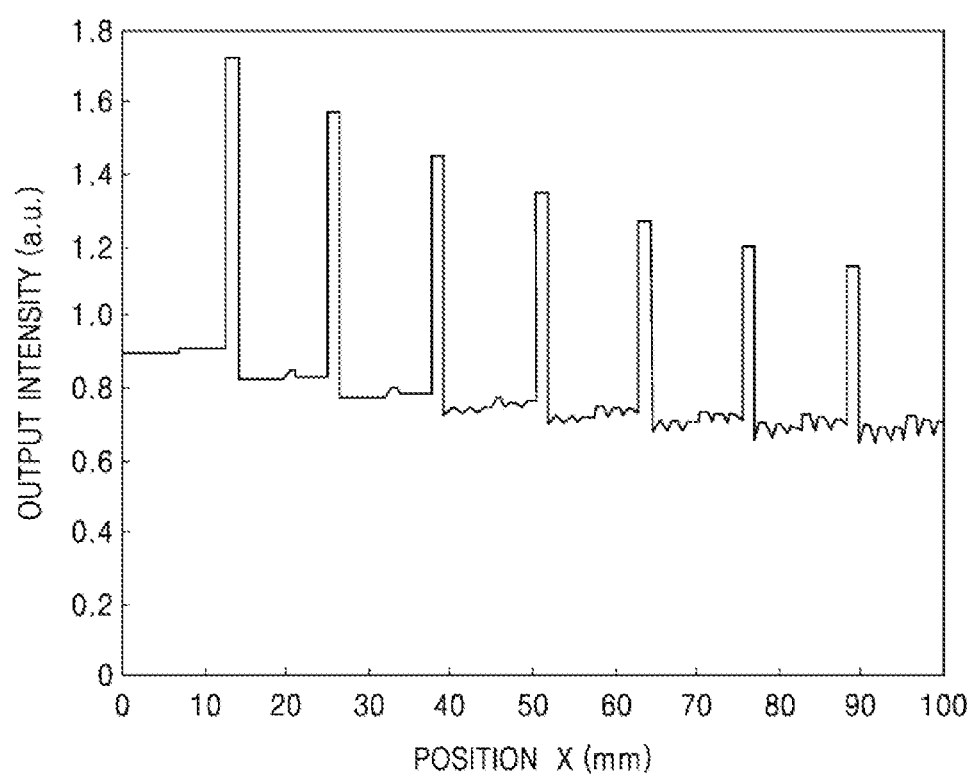
FIGS. 2A, 2B, 2C, and 2D illustrate a change in output intensity depending on the position of a light guide plate when changing the transmittance of a layer included in the light guide plate of a backlight unit.
Figure 2B:
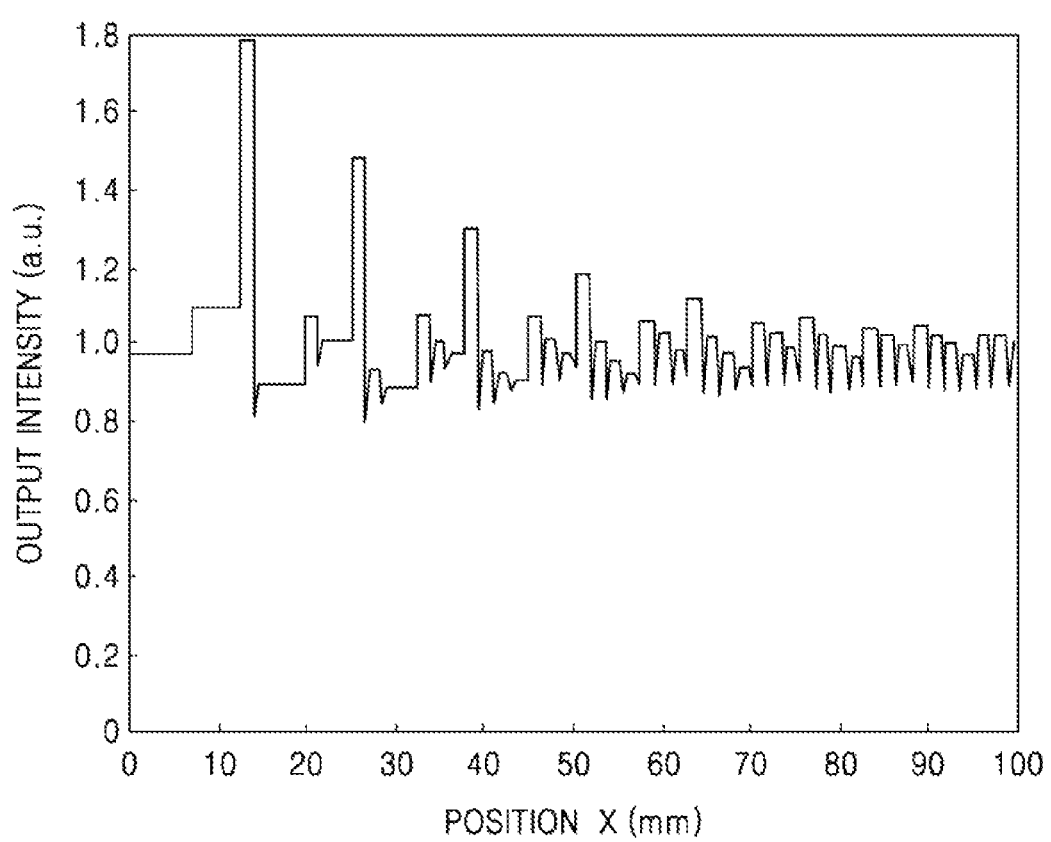
Figure 2C:
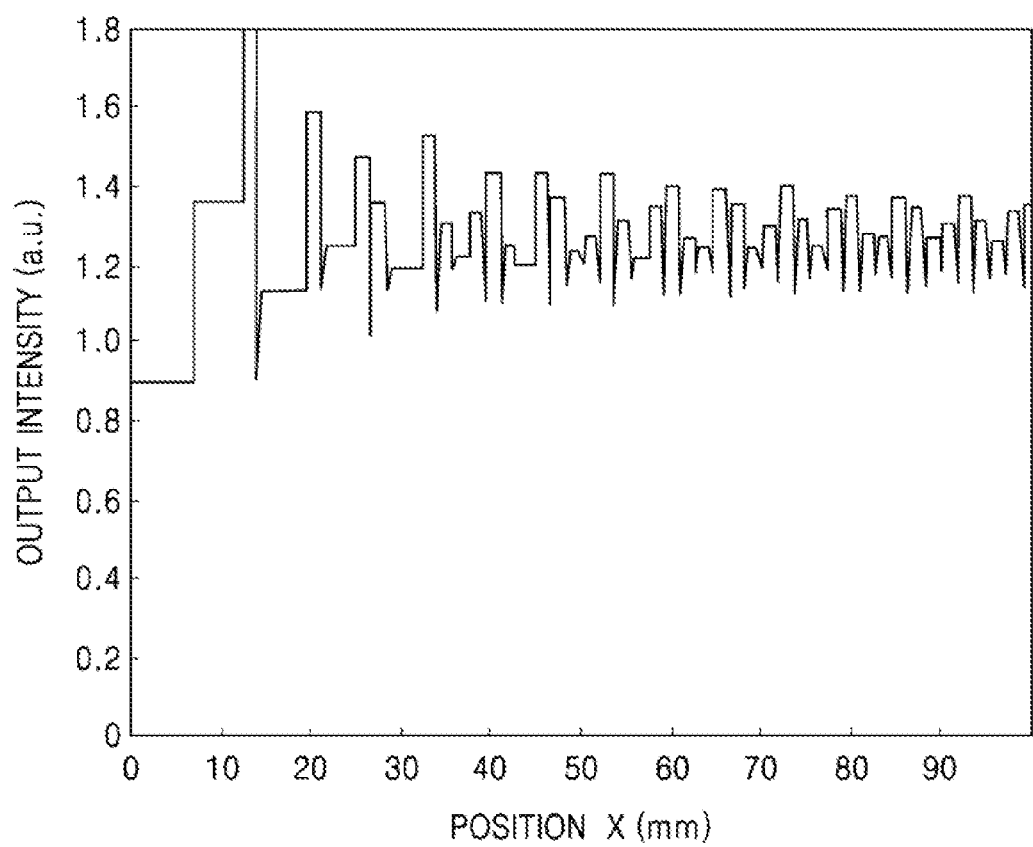
Figure 2D:
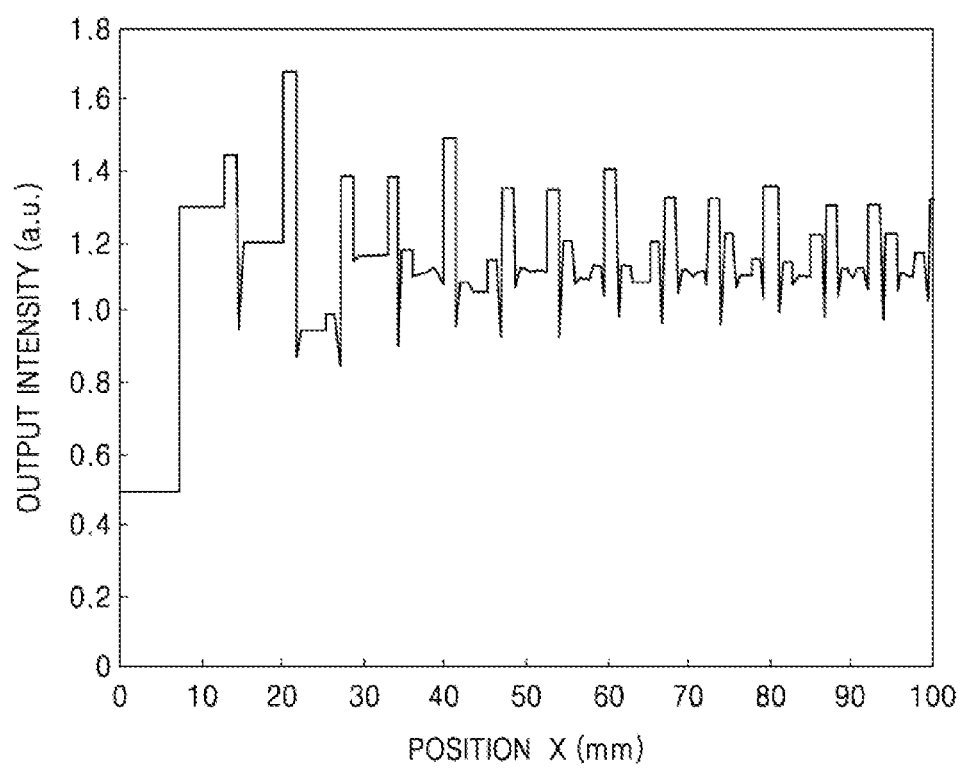

Reference will now be made in detail to exemplary embodiments which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, light guide plates, backlight units, and holographic display apparatuses including the same will be described in detail with reference to the accompanying drawings. In the drawings, the size of each element may be exaggerated for clarity and convenience of description. Also, the exemplary embodiments described below are merely examples, and various modifications may be made therein. Also, in a layer structure described below, the terms "over" or "on" may include not only "directly over" or "directly on" but also "indirectly over" or "indirectly on".

Although terms such as "first" and "second" may be used herein to describe various elements or components, these elements or components should not be limited by these terms. These terms are only used to distinguish one element or component from another element or component.

As used herein, the singular forms "a", "an", and "the" are intended to include the plural forms as well, unless the context clearly indicates otherwise. Also, when something is referred to as "including" a component, another component may be further included unless specified otherwise.

Also, the terms "units" and "modules" used herein may refer to units that perform at least one function or operation, and the units may be implemented as hardware or software or a combination of hardware and software.

FIG. 1 is a schematic cross-sectional view of a backlight unit 100 according to an exemplary embodiment.

The backlight unit 100 may include a light source 110 and a light guide plate 120 configured to guide light from the light source 110.

The light source 110 may provide a coherent light beam. The light source 110 may include a laser diode. However, since light may have coherence by being diffracted and modulated by a spatial light modulator, another light source may also be used if it emits light having a desired spatial coherence.

The light source 110 may include a plurality of light sources emitting light of different wavelengths. For example, the light source 110 may include a first light source emitting light of a first wavelength band, a second light source emitting light of a second wavelength band different from the first wavelength band, and a third light source emitting light of a third wavelength band different from the first and second wavelength bands. Lights of first, second, and third wavelength bands may be respectively red, green, and blue light.

The light guide plate 120 may include two or more layers. The two or more layers may be configured to guide light through total internal reflection.

The two or more layers may be configured to control a ratio between light reflectance and light transmittance. For example, two adjacent layers among the two or more layers may have different refractive indices. For example, the light guide plate 120 may include a first layer 121, a second layer 122, and a third layer 123, and the first layer 121 and the second layer 122 may have different refractive indices. The first layer 121 and the second layer 122 may have a refractive index difference of about 0.2 or more therebetween. Also, the first layer 121 may have a smaller refractive index than the second layer 122. However, this is merely exemplary, and the first layer 121 may have a greater refractive index than the second layer 122. In this case, when light is guided in the first layer 121, if light is incident at such an angle that total internal reflection does not occur at an interface between the first layer 121 and the second layer 122, some light may be transmitted through this interface and some light may be reflected. A refractive index difference between the first layer 121 and the second layer 122 may be determined such that light is guided while total internal reflection does not occur at an interface between the first layer 121 and the second layer 122.

For example, the first layer 121 and the second layer 122 each may have a refractive index of about 1.2 to about 2.0. The first layer 121 and the second layer 122 may include a resin or glass that transmits light of about 400 nm to about 2,000 nm.

The second layer 122 and the third layer 123 may have different refractive indices. The second layer 122 and the third layer 123 may have a refractive index difference of about 0.2 or more therebetween. Also, the second layer 122 may have a smaller refractive index than the third layer 123. However, this is merely exemplary, and the second layer 122 may have a greater refractive index than the third layer 123. In this case, when light is guided in the second layer 122, if light is incident at such an angle that total internal reflection does not occur at an interface between the second layer 122 and the third layer 123, some light may be transmitted through this interface and some light may be reflected. A refractive index difference between the second layer 122 and the third layer 123 may be determined such that light is guided while total reflection does not occur at the interface between the second layer 122 and the third layer 123.

For example, the second layer 122 and the third layer 123 each may have a refractive index of about 1.2 to about 2.0. The second layer 122 and the third layer 123 may include a resin or glass that transmits light having a wavelength in a range of about 400 nm to about 2,000 nm.

The first layer 121 and the third layer 123 may have different refractive indices or may have the same refractive index. The second layer 122 may be an adhesive layer for bonding the first layer 121 and the third layer 123. For example, the second layer 122 may have the same refractive index as at least one of the first layer 121 and the third layer 123. An adhesive layer may comprise an adhesive resin which may have a refractive index that is the same as the refractive index of at least one of the layers bonded by the resin.

A reflective layer 130 may be further provided below the first layer 121. The reflective layer 130 may have a reflectance of about 90% or more. The reflective layer 130 may have any coating having a reflection function, and may have a dielectric coating. The reflective layer 130 may be omitted from in a region through which the light from the light source 110 is transmitted, such that the light irradiated by the light source 110 may be incident onto the first layer 121.

An input grating 140 and an output grating 150 may be further provided on the third layer 123. After passing through the first to third layers 121, 122, and 123, the light irradiated from the light source 110 may be reflected by the input grating 140 to propagate within the light guide plate 120. The input grating 140 may adjust an angle at which the light is reflected, to control the direction in which the light propagates within the light guide plate 120. Red light, green light, and blue light may be incident on the input grating 140, and light may propagate through the light guide plate 120 by total internal reflection. The output grating 150 may be configured to output parallel light. The output grating 150 may be, for example, a diffractive optical element for diffracting and transmitting a portion of the light incident thereon.

In a backlight unit according to various exemplary embodiments, a light guide plate may include two or more layers to increase the uniformity of output light.

Transmittance may be determined by refractive index differences between the layers of the light guide plate. For example, the transmittance between the first layer 121 and the second layer 122 may be determined by the refractive index difference between the first layer 121 and the second layer 122. The light transmitted through the interface between the first layer 121 and the second layer 122 may be guided within the third layer 123, and the light reflected at the interface between the first layer 121 and the second layer 122 may be guided within the first layer 121.

Figure 10:
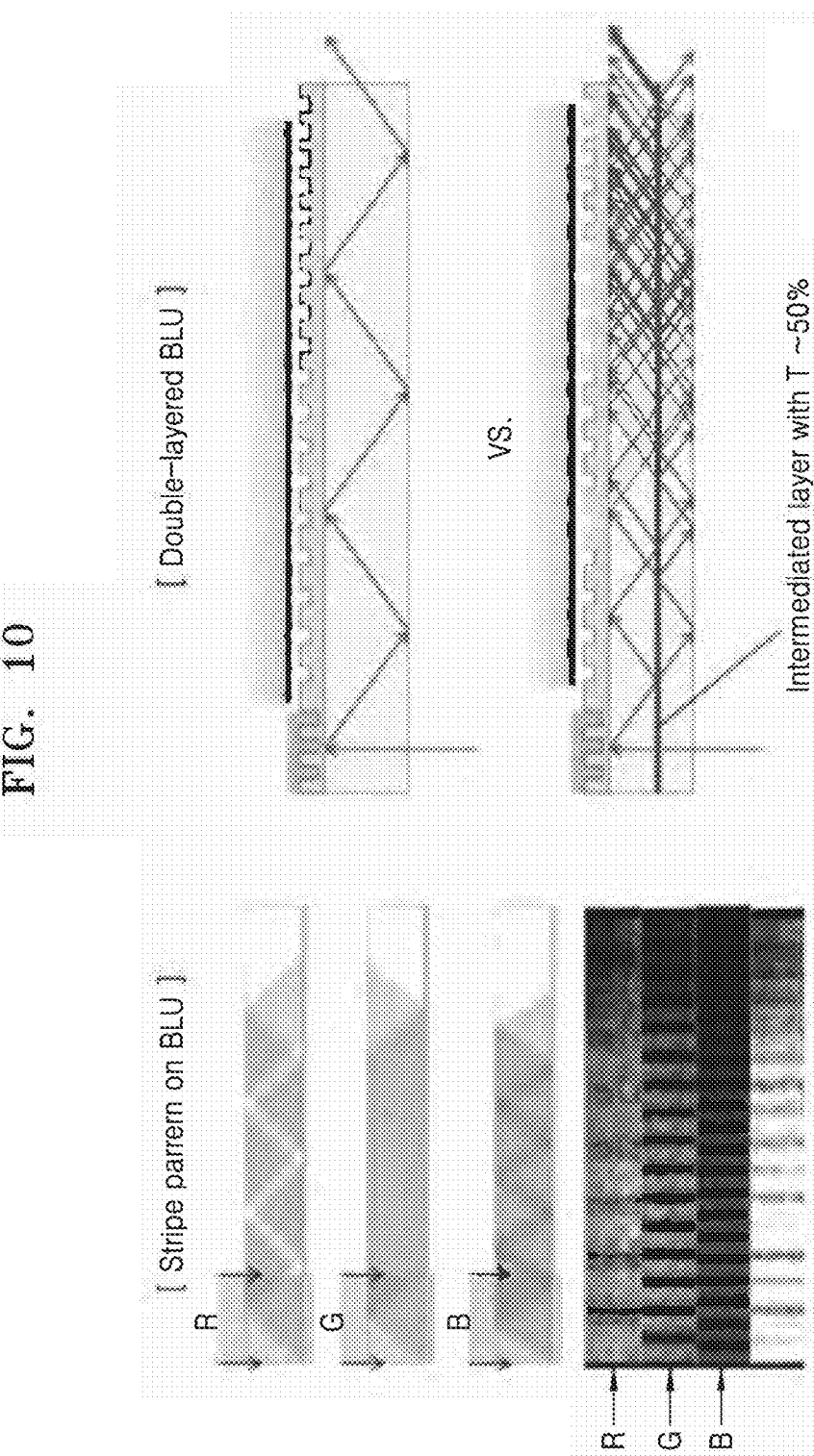
FIG. 10 illustrates effects of the use of a single-layer backlight unit, as compared to a multi-layer backlight unit, according to an exemplary embodiment.
Figure 11:
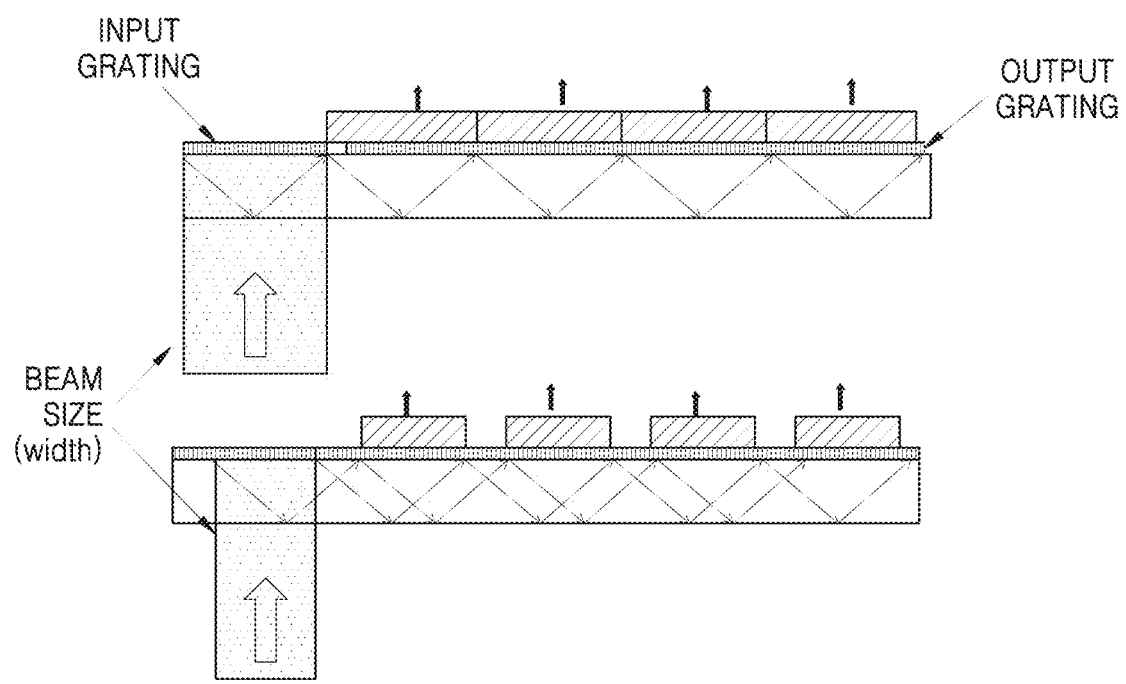
FIG. 11 illustrates effects of different beam widths with respect to a backlight unit according to an exemplary embodiment.

When a light guide plate includes only a single layer, a stripe may be formed in the light output through the light guide plate, as shown, for example, in FIG. 10. The beam width of the input light may be fixed, and a stripe may be generated due to a light guide angle change caused by beam steering. For example, a BLU may utilize a beam width of about 14 mm, and may thereby enable +6° beam steering. As the width of the input beam increases, the black stripe reduction may improve, as shown, for example, in FIG. 11. An increase in the beam width, though, also requires an undesired increase in the size of a bezel. However, as in the present exemplary embodiment, when the light guide plate includes two or more layers, the number of times the light is guided (hereinafter referred to as the light guide count) may be determined to reduce the stripe.

A transmittance (or reflectance) at an interface between two layers having different refractive indices may be determined by three independent variables. The three independent variables may be defined as the light polarization (p-polarized light, s-polarized light), the angle of incidence (0-90 degrees), and the refractive index ratio ($n_2/n_1$, where $n_1$ and $n_2$ are refractive indices of the two layers, respectively). In a transverse electric (TE) mode, the stripe may be effectively reduced when the refractive index difference is about 0.2 or more.

In the case of s-polarized light, the transmittance may be calculated as in Equation 1 below.

$$\alpha = n_2/n_1$$
$$R_s = \left| \frac{\cos\theta_1 - \alpha\cos\theta_2}{\cos\theta_1 + \alpha\cos\theta_2} \right|^2 \times 100\%$$
$$T_s = 100\% - R_S$$

Equation 1

In the case of p-polarized light, the transmittance may be calculated as in Equation 2 below.

$$\alpha = n_2/n_1$$
$$R_p = \left| \frac{\cos\theta_2 - \alpha\cos\theta_1}{\cos\theta_2 + \alpha\cos\theta_1} \right|^2 \times 100\%$$
$$T_p = 100\% - R_p$$

Equation 2

Herein, $\theta_1$ may denote an angle of incidence of the light from the first layer 121 to the second layer 122, and $\theta_2$ may denote a refraction angle thereof.

The transmittance of the first layer and the second layer may be adjusted according to Equation 1 and Equation 2, and the light guide count may vary according to the transmittance. The stripe may decrease as the light guide count increases. In the case of s-polarized light, in comparison with p-polarized light, the light guide count may increase and thus the stripe may decrease.

The angle of incidence of the light on the second layer may vary according to the refractive index of the first layer. As the angle of incidence of the light on the second layer, the light guide count may increase and thus the stripe may decrease. The light guide count may represent the number of times the light is totally internally reflected within the layer.

A simulation was performed on a multi-layer structure for reducing a color stripe. Three main variables were set to be the transmittance, the light guide distance in the first layer, and the light guide distance in the second layer. The light guide distance may be a distance traveled by the light within the layer. FIGS. 2A, 2B, 2C, and 2D respectively illustrate the output intensities depending on the positions of the light guide plate when the transmittances are 0.1, 0.3, 0.4, and 0.7, a light guide distance of the first layer is 6.3 mm, and a light guide distance of the second layer is 3.6 mm. The simulation showed that when the transmittance between the first layer and the second layer was about 50%, the stripe decreased and the light uniformity improved. For example, when the transmittance between the first layer and the second layer is about 40% to about 60%, the stripe may decrease.

When the light guide distance difference between the first layer 121 and the second layer 122 was small, the stripe was generated more than when the light guide distance difference between the first layer 121 and the second layer 122 was great.

Figure 3A:
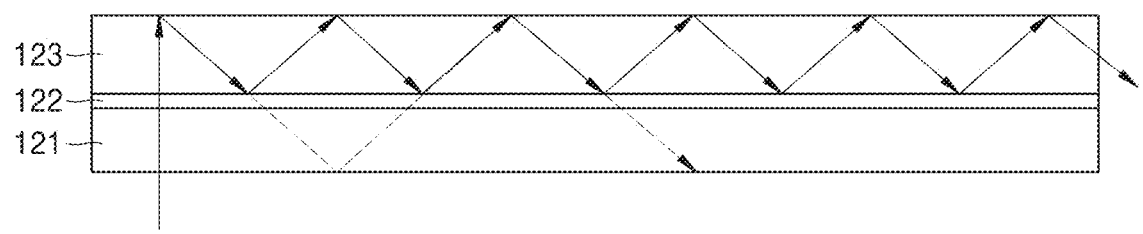
FIGS. 3A and 3B illustrate an example of changing the thickness of a layer of a backlight unit according to an exemplary embodiment.
Figure 3B:
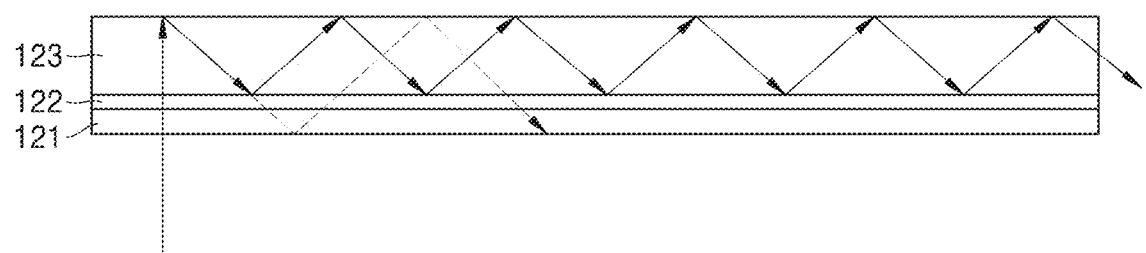

The first layer 121 and the third layer 123 may have a thickness of about 0.1 mm to about 5.0 mm, and the second layer 122 may have a thickness of about 50 nm to about 5.0 mm. The first layer 121 may be thinner than the third layer 123. FIG. 3A illustrates a light path when the first layer 121 and the third layer 123 have the same thicknesses, and FIG. 3B illustrates a light path when the first layer 121 is thinner than the third layer 123. When the first layer 121 is thinner than the third layer 123, the light may be guided more uniformly.

Figure 4:
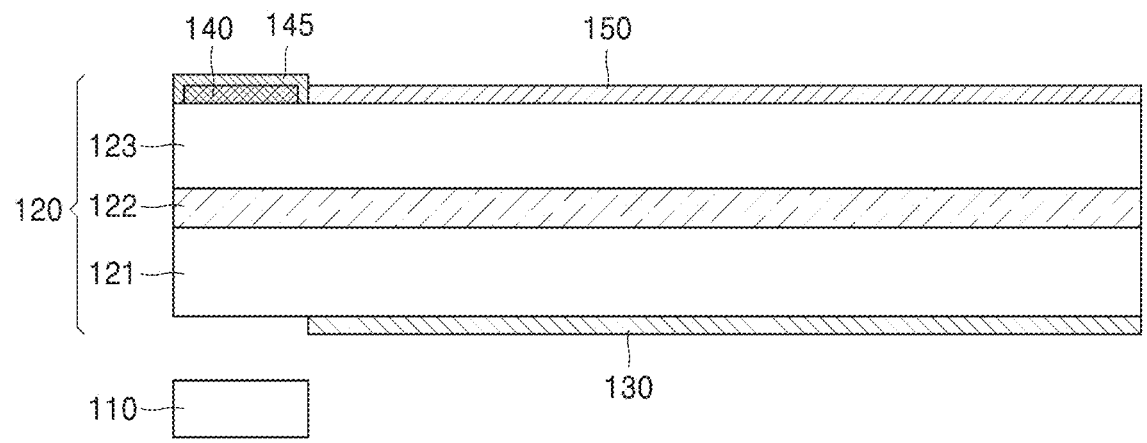
FIG. 4 schematically illustrates a backlight unit according to another exemplary embodiment.

FIG. 4 illustrates an example in which a reflective layer 145 is further provided at the input grating 140 in comparison with FIG. 1. The reflective layer 145 may prevent the light efficiency from being degraded because the light is transmitted and outputted through the input grating 140.

Figure 5:
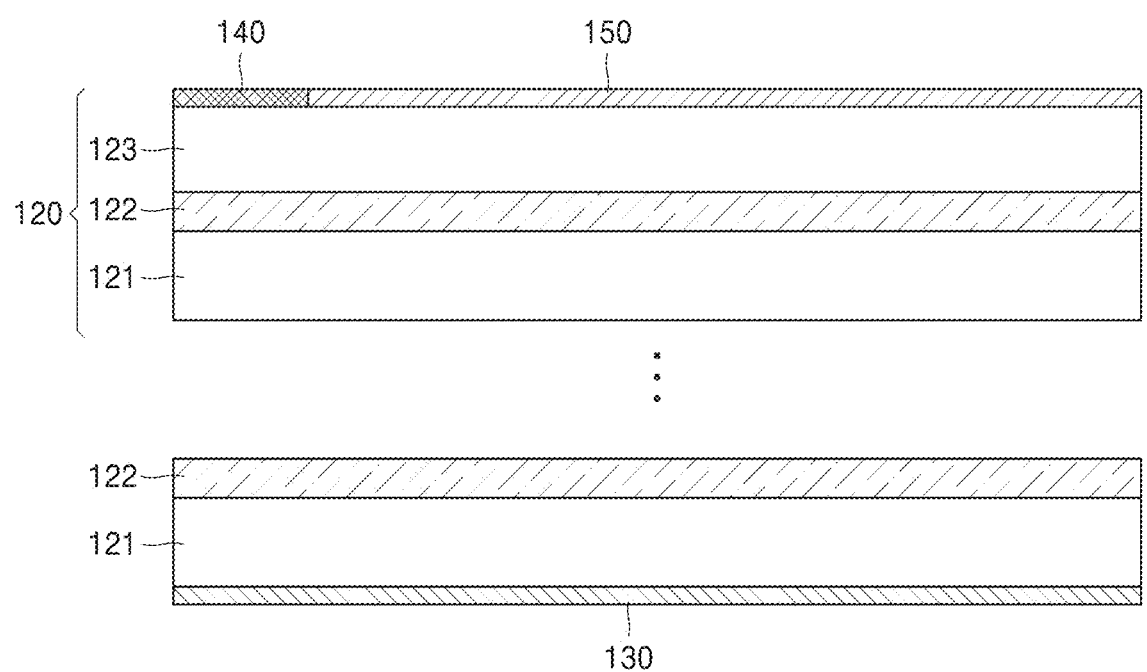
FIG. 5 illustrates a structure in which layers included in a light guide plate of the backlight unit according to the exemplary embodiment illustrated in FIG. 1 are stacked a plurality of times.

FIG. 5 illustrates a structure in which the first layer 121 and the second layer 122 are stacked repeatedly two or more times. In the present exemplary embodiment, the light guide plate may include three or more layers to increase the light uniformity and to reduce the stripe. For example, the first layer 121 and the second layer 122 may be stacked repeatedly two to four times.

Figure 6:
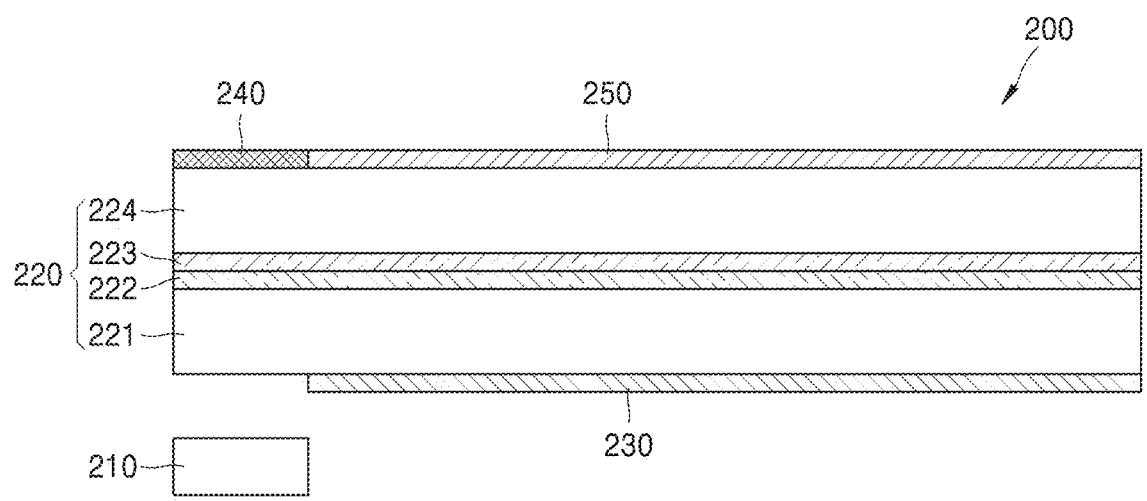
FIG. 6 schematically illustrates a backlight unit according to another exemplary embodiment.

FIG. 6 illustrates a backlight unit 200 according to another exemplary embodiment.

The backlight unit 200 may include a light source 210 and a light guide plate 220 including two or more layers. The light source 210 may provide a coherent light beam. The light source 210 may include a laser diode.

The light guide plate 220 may include two or more layers. The two or more layers may be light guiding layers.

At least one of the two or more layers may be a transmittance control layer configured to adjust a transmittance.

For example, the light guide plate 220 may include a first layer 221, a second layer 222, a third layer 223, and a fourth layer 224.

The first layer 221 and the fourth layer 224 may each function as a light propagation path, and the third layer 223 may be a transmittance control layer configured to adjust light transmittance. The third layer 223 may be a dielectric mirror coating layer. The third layer 223 may have a transmittance of about 40% to about 60%, for example. As for the light incident on the first layer 221, some light may be reflected and some light may be transmitted through the third layer 223. The light transmitted through the third layer 223 may be guided within the fourth layer 224, and the light reflected at the third layer 223 may be guided within the first layer 221.

The second layer 222 may be an adhesive layer for bonding the first layer 221 and the fourth layer 224. In this case, the first layer 221 and the second layer 222 may have the same refractive index. Alternatively, the third layer 223 may be an adhesive layer, and the second layer 222 may be a transmittance control layer. In this case, the third layer 223 and the fourth layer 224 may have the same refractive index. The first layer 221 and the fourth layer 224 may have the same refractive index. Although the first layer 221 and the fourth layer 224 may have different refractive indices, even when the first layer 221 and the fourth layer 224 have the same refractive index, the transmittance may be adjusted by the second layer 222 to reduce the stripe of the light output from the light guide plate. Also, when the light guide plate includes two or more layers, the light uniformity may increase.

For example, the first layer 221 and the fourth layer 224 each may have a refractive index of about 1.2 to about 2.0. The first layer 221 and the fourth layer 224 may each include a resin or glass that transmits light of about 400 nm to about 2,000 nm.

A reflective layer 230 may be further provided under the first layer 221. The reflective layer 230 may have a reflectance of about 90% or more. The reflective layer 230 may be omitted in a region through which the light from the light source 210 is transmitted, such that the light irradiated by the light source 210 may be incident onto the first layer 221.

An input grating 240 and an output grating 250 may be further provided on the fourth layer 224. After passing through the first to fourth layers 221, 222, 223, and 224, the light irradiated from the light source 210 may be reflected by the input grating 240 to propagate within the light guide plate 220. The input grating 240 may adjust an angle at which the light is reflected, to control a direction in which the light propagates within the light guide plate 220. Red light, green light, and blue light may be incident onto the input grating 240, and the light may propagate through the light guide plate 220 by total internal reflection. The output grating 250 may be configured to output parallel light.

In the present exemplary embodiment, the transmittance control layer may be used to adjust the light guide count to reduce the stripe.

The first layer 221 and the fourth layer 224 each may have a thickness of about 0.1 mm to about 5 mm. The first layer 221 and the fourth layer 224 may have the same thickness. Alternatively, the first layer 221 and the fourth layer 224 may have different thicknesses.

Figure 7:
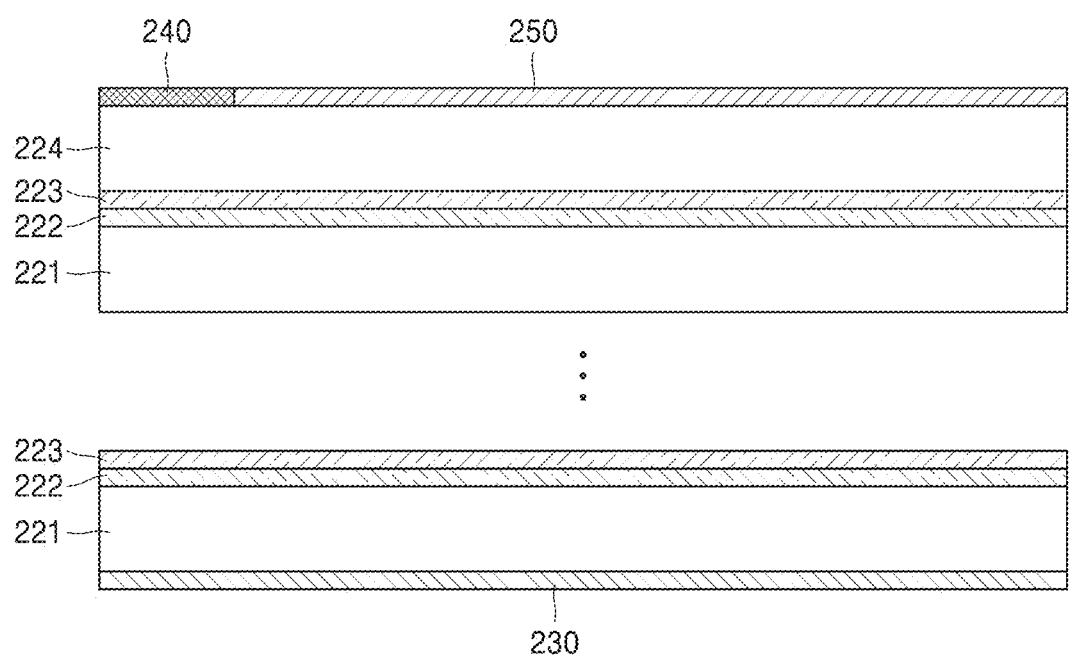
FIG. 7 illustrates a structure in which layers included in a light guide plate of the backlight unit according to the exemplary embodiment illustrated in FIG. 6 are stacked a plurality of times.

FIG. 7 illustrates a structure in which the first layer 221 and the fourth layer 224 are stacked repeatedly two or more times. For example, the first layer 221 and the fourth layer 224 may be stacked repeatedly two to four times. In the present exemplary embodiment, the light guide plate may include three or more layers to increase the light uniformity, and the transmittance control layer may be used to reduce the stripe. For example, the first layer 221, the second layer 222, the third layer 223, the fourth layer 224, the second layer 222, the third layer 223, the first layer 221, the second layer 222, the third layer 223, and the fourth layer 224 may be stacked, in that order.

Figure 8:
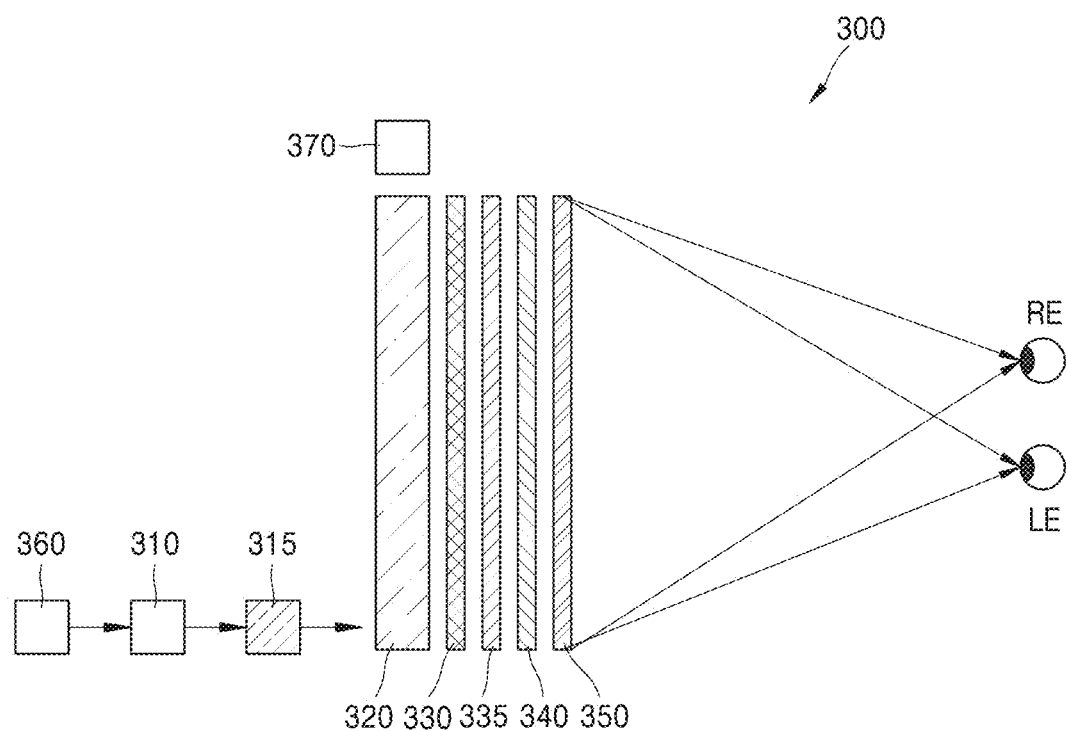
FIG. 8 illustrates a holographic display apparatus according to an exemplary embodiment.

FIG. 8 illustrates a holographic display apparatus 300 according to an exemplary embodiment.

The holographic display apparatus 300 may include a light source 310 configured to provide light, a light guide plate 320 configured to guide the light from the light source 310, and a spatial light modulator 350 configured to reproduce a holographic image by diffracting the light from the light guide plate 320. The light source 310 may provide a coherent light beam. The light guide plate 320 may be the same as those in the examples described with reference to FIGS. 1 to 7, and thus redundant descriptions thereof will be omitted for conciseness.

A field lens 340 may be provided between the light guide plate 320 and the spatial light modulator 350 to focus the holographic image reproduced by the spatial light modulator 350 on a predetermined space. Also, first and second beam steerers 330 and 335 may be provided to two-dimensionally control the propagation direction of the light output from the light guide plate 320. The first and second beam steerers 330 and 335 may adjust the position of a light beam output according to the pupil position of a viewer. For example, the first beam steerer 330 may adjust the horizontal position of the light beam, and the second beam steerer 335 may adjust the vertical position of the light beam. The first and second beam steerers 330 and 335 may include, for example, liquid crystal layers or electrowetting elements.

Although FIG. 8 illustrates that the field lens 340 is located between the second beam steerer 335 and the spatial light modulator 350, this is merely exemplary, and the field lens 340 may be located in a different position. For example, the field lens 340 may be located in front of the spatial light modulator 350.

A beam expander 315 may be provided between the light source 310 and the light guide plate 320. The beam expander 315 may primarily expand the light beam by collimating the point light from the light source 310. The beam expander 315 may include, for example, a collimating lens. As the light beam is collimated to make the divergence angle of the light beam closer to 0 degree, the coherence of the light may be increased. Thus, the light beam may be collimated by the beam expander 315 to improve the quality of the holographic image.

The holographic display apparatus 300 may further include an eye-tracking sensor 370 configured to recognize the position of the viewer, and may include a controller 360 configured to control the first and second beam steerers 330 and 335 according to the sensed position from the eye-tracking sensor 370. The eye-tracking sensor 370 may include an infrared camera, a visible light camera, or any of various other sensors.

The controller 360 may also control the operation of the light source 310. For example, the controller 360 may sequentially control the irradiation directions of light beams such that holographic images are sequentially formed at the left eye and the right eye of the viewer.

The holographic display apparatus 300 according to the present exemplary embodiment may provide holographic images of different viewpoints respectively to the left eye (LE) and the right eye (RE) of the viewer by the binocular hologram method. For example, the holographic display apparatus 300 may provide a left-eye holographic image to the left-eye (LE) view field of the viewer and may provide a right-eye holographic image different from the left-eye holographic image to the right-eye (RE) view field of the viewer. Unlike left-eye and right-eye stereoscopic images, the left-eye holographic image and the right-eye holographic image provided by the holographic display apparatus 300 may alone provide a three-dimensional effect to the viewer, and only the viewpoints thereof are different from each other. In the case of a stereoscopic method, a stereoscopic effect is provided by using a binocular parallax when a left-eye two-dimensional image and a right-eye two-dimensional image having different viewpoints are recognized respectively by the left eye and the right eye of the viewer. Thus, in the stereoscopic method, a stereoscopic effect is not presented by only one of the left-eye image and the right-eye image, and the viewer may feel fatigue because the focus of the eyes does not match the depth recognized by the brain. On the other hand, since the holographic display apparatus 300 forms a left-eye holographic image and a right-eye holographic image respectively at positions in a predetermined space, that is, respectively at the left-eye (LE) view field and the right-eye (RE) view field of the viewer, the focus of the eyes may match the depth recognized by the brain and it may provide a full parallax. Since the viewer may recognize only two viewpoints with the left eye (LE) and the right eye (RE), respectively, the holographic display apparatus 300 according to the present exemplary embodiment provides only these two binocular viewpoints in order to reduce data throughput by removing viewpoint information other than the viewpoint information recognizable by the viewer. However, holographic display apparatuses according to various exemplary embodiments may also provide more viewpoints.

The positions at which the holographic image are focused may be adjusted by the first and second beam steerers 330 and 335. In other words, the left-eye position at which the left-eye holographic image is focused and the right-eye position at which the right-eye holographic image is focused may be adjusted by the first and second beam steerers 330 and 335. The left-eye/right-eye interval unique to each viewer may be sensed by the eye-tracking sensor 370, and a change in the left-eye/right-eye position due to the motion of the viewer may also be sensed. According to the sensed information, the first and second beam steerers 330 and 335 may control the propagation direction of the light beam.

One of the first beam steerer 330 and the second beam steerer 335 may be a liquid crystal deflector that diffracts an incident light to generate two light beams propagating at different angles. When one of the first and second beam steerers 330 and 335 spatially divides the light so as to be directed toward the left eye and the right eye at the same time, the sequential operation of the light source 110 may not be necessary.

The field lens 340 may focus the direction-controlled light from the first and second beam steerers 330 and 335 onto a predetermined space. The field lens 340 may include a Fresnel lens, a liquid crystal lens, and/or a holographic optical element.

The direction-controlled light from the first and second beam steerers 330 and 335 is incident onto the spatial light modulator 350 through the field lens 340. The spatial light modulator 350 may function to form a hologram pattern having an interference pattern for modulating the incident light. The incident light may be diffracted and modulated by the hologram pattern formed by the spatial light modulator 350 such that the holographic image may be reproduced at a predetermined spatial position.

The holographic display apparatus according to an exemplary embodiment may be applied to, for example, a mobile phone. By using the eye-tracking sensor 370 and the beam steerers, a three-dimensional image may be displayed according to the positions of the user's eyes by tracking the movement of the positions of the user's eyes when the user views the screen of the mobile phone.

Figure 9:
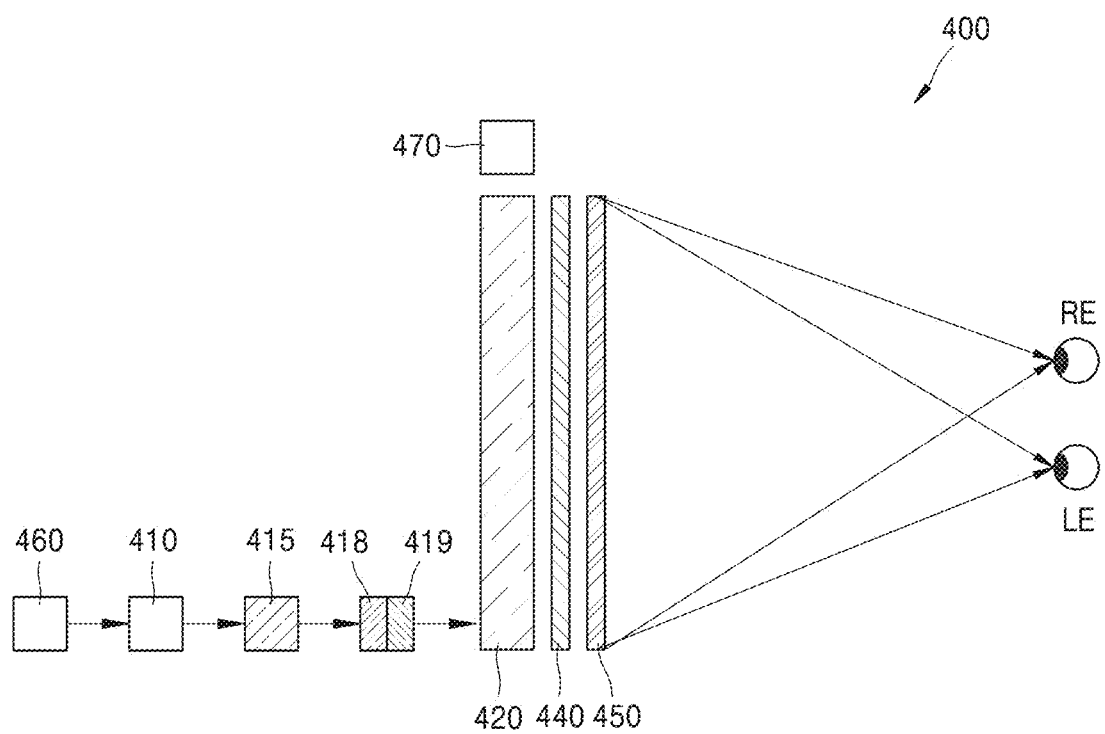
FIG. 9 illustrates a holographic display apparatus according to another exemplary embodiment.

FIG. 9 illustrates a holographic display apparatus 400 according to another exemplary embodiment.

The holographic display apparatus 400 may include a light source 410 configured to provide light, a light guide plate 420 configured to guide the light from the light source 410, and a spatial light modulator 450 configured to reproduce a holographic image by diffracting the light from the light guide plate 420. The light source 410 may provide a coherent light beam. The light guide plate 420 may be the same as those in the examples described with reference to FIGS. 1 to 7, and thus redundant descriptions thereof will be omitted for conciseness.

A field lens 440 may be provided between the light guide plate 420 and the spatial light modulator 450 to focus the holographic image reproduced by the spatial light modulator 450 onto a predetermined space.

A beam expander 415 may be provided between the light source 410 and the light guide plate 420. The beam expander 415 may primarily expand the light beam by collimating the point light from the light source 410.

Also, first and second beam steerers 418 and 419 may be provided between the light source 410 and the light guide plate 420 to two-dimensionally control the propagation direction of the light. The first and second beam steerers 418 and 419 may adjust the position of the light beam output according to the pupil position of the viewer. For example, the first beam steerer 418 may adjust the horizontal position of the light beam, and the second beam steerer 419 may adjust the vertical position of the light beam.

The holographic display apparatus 400 may further include an eye-tracking sensor 470 configured to recognize the position of the viewer, and may further include a controller 460 configured to control the first and second beam steerers 418 and 419 according to the sensed position from the eye-tracking sensor 470.

The controller 460 may also control the operation of the light source 410. For example, the controller 460 may sequentially control the irradiation directions of light beams such that holographic images are sequentially directed to the left eye and the right eye of the viewer.

As for the comparison between FIG. 8 and FIG. 9, since the positions of the beam steerers are different and the components of the same name perform substantially the same function and operation, redundant descriptions thereof will be omitted for conciseness.

The backlight unit according to an exemplary embodiment may be applied to, for example, a holographic display, a mobile phone, and a three-dimensional television (3D TV). In the holographic display apparatus according to an exemplary embodiment, by the light guide plate including a stack of a plurality of layers, the light uniformity may be improved and the stripe may be reduced.

The above embodiments are merely exemplary, and those of ordinary skill in the art may derive various modifications and other equivalent embodiments therefrom. Thus, the spirit and scope of the inventive concept should be defined by the following claims.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A backlight unit comprising:
a light source: and
a light guide plate comprising at least two layers configured to guide light from the light source, wherein each of the at least two layers is configured to control a ratio of light reflected thereby and light transmitted therethrough,
wherein the at least two layers comprises a first layer, a second layer, and a third layer, wherein a refractive index of the second layer is different than at least one of a refractive index of the first layer and a refractive index of the third layer, and
wherein a difference between the refractive index of the first layer and the refractive index of the second layer is at least about 0.2.

2. The backlight unit of claim 1, wherein the refractive index of the second layer is different than the refractive index of the third layer.

3. The backlight unit of claim 2, wherein a difference between the refractive index of the second layer and the refractive index of the third layer is at least about 0.2.

4. The backlight unit of claim 1, wherein each of the refractive index of the first layer, the refractive index of the second layer, and the refractive index of the third layer is about 1.2 to about 2.0.

5. The backlight unit of claim 1, wherein a thickness of the first layer and a thickness of the third layer are each about 0.1 mm to about 5 mm.

6. The backlight unit of claim 1, further comprising a reflective layer disposed on the first layer.

7. The backlight unit of claim 1, wherein the second layer comprises an adhesive layer.

8. The backlight unit of claim 1, wherein the light guide plate comprises at least two stacks, each comprising the first layer, the second layer, and the third layer.

9. The backlight unit of claim 1, further comprising an input grating disposed on the third layer, and an output grating disposed on the third layer.

10. The backlight unit of claim 1, wherein a thickness of the first layer is different than a thickness of the third layer.

11. The backlight unit of claim 1, wherein a thickness of the first layer is less than a thickness of the third layer.

12. The backlight unit of claim 1, wherein one of the at least two layers comprises a transmittance control layer provided between the first layer and the third layer.

13. The backlight unit of claim 12, wherein the transmittance control layer has a transmittance of about 40% to about 60%.

14. The backlight unit of claim 1, wherein the at least two layers comprises: the first layer; the second layer comprising an adhesive layer; the third layer configured to control transmittance; and a fourth layer.

15. The backlight unit of claim 14, wherein a thickness of the first layer and a thickness of the fourth layer are each about 0.1 mm to about 5 mm.

16. The backlight unit of claim 14, wherein the light guide plate comprises at least two stacks, each comprising the first layer, the second layer, the third layer, and the fourth layer.

17. The backlight unit of claim 14, further comprising an input grating disposed on the fourth layer and an output grating disposed on the fourth layer.

18. The backlight unit of claim 14, wherein a thickness of the first layer is different than a thickness of the fourth layer.

19. The backlight unit of claim 1, wherein the transmittance between the at least two layers is obtained based on polarization of the light, angle of incidence at the at least two layers, and refractive indices of the at least two layers.

20. The backlight unit of claim 1, wherein the second layer is directly disposed on the first layer;
the third layer is directly disposed on the second layer, and
the second layer is sandwiched between the first layer and the third layer.

21. A light guide plate comprising:
a first layer configured to guide light therein;
a second layer; and
a third layer configured to guide light therein,
wherein the light guide plate is configured to control a ratio of light reflected thereby and light transmitted therethrough,
wherein a difference between a refractive index of the first layer and a refractive index of the second layer is at least about 0.2.

22. The light guide plate of claim 21, wherein the second layer comprises a coating layer configured to control a transmittance of light therethrough.

23. The light guide plate of claim 22, wherein a transmittance of the second layer is in a range of about 40% to about 60%.

24. A holographic display apparatus comprising:
a light source;
a light guide plate comprising at least two layers configured to guide light from the light source, wherein each of the at least two layers is configured to control a ratio of light reflected thereby and light transmitted therethrough; and
a spatial light modulator configured to reproduce a holographic image by diffracting light from the light guide plate and incident on the spatial light modulator,
wherein the at least two layers comprises a first layer having a first refractive index and a second layer having a second refractive index different from the first refractive index, and
a difference between the first refractive index and the second refractive index is at least about 0.2.

25. The holographic display apparatus of claim 24, wherein the at least two layers comprises a transmittance control layer.

26. The holographic display apparatus of claim 25, wherein the transmittance control layer has a transmittance in a range of about 40% to about 60%.

* * * * *